United States Patent
Herman et al.

(10) Patent No.: US 10,082,957 B2
(45) Date of Patent: Sep. 25, 2018

(54) DUAL-PORTED PCI EXPRESS-BASED STORAGE CARTRIDGE INCLUDING SINGLE-PORTED STORAGE CONTROLLERS

(71) Applicant: Western Digital Technologies, Inc., Irvine, CA (US)

(72) Inventors: Pinchas Herman, Sunnyvale, CA (US); Vijay Karamcheti, Palo Alto, CA (US); Rodney N. Mullendore, San Jose, CA (US); William H. Radke, Los Gatos, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 217 days.

(21) Appl. No.: 15/215,304

(22) Filed: Jul. 20, 2016

(65) Prior Publication Data

US 2018/0024743 A1    Jan. 25, 2018

(51) Int. Cl.
    *G06F 15/16* (2006.01)
    *G06F 3/06* (2006.01)
    *G06F 13/40* (2006.01)

(52) U.S. Cl.
    CPC ............ *G06F 3/0604* (2013.01); *G06F 3/067* (2013.01); *G06F 3/0659* (2013.01); *G06F 13/4022* (2013.01)

(58) Field of Classification Search
    None
    See application file for complete search history.

(56) References Cited

U.S. PATENT DOCUMENTS

| | | | |
|---|---|---|---|
| 7,890,690 B2 | 2/2011 | Naderi et al. | |
| 8,020,035 B2 | 9/2011 | Voigt et al. | |
| 8,566,416 B2* | 10/2013 | Luo | G06F 3/0607 |
| | | | 709/203 |
| 8,589,723 B2 | 11/2013 | Kumar et al. | |
| 9,419,918 B2* | 8/2016 | Egi | H04L 41/12 |
| 2012/0166699 A1 | 6/2012 | Kumar et al. | |
| 2015/0255130 A1 | 9/2015 | Lee et al. | |

(Continued)

FOREIGN PATENT DOCUMENTS

WO    2008025238 A1    3/2008

OTHER PUBLICATIONS

Rui et al.: "Cost Effective Data Center Servers" In: High Performance Computer Architecture (HPCA2013), 2013 IEEE 19th International Symposium on. IEEE, 2013 pp. 179-187.

(Continued)

*Primary Examiner* — Cheng-Yuan Tseng
(74) *Attorney, Agent, or Firm* — Patterson & Sheridan, LLP; Steven Versteeg

(57) ABSTRACT

A storage cartridge may include a storage controller comprising a single PCIe port and a PCIe switch. The PCIe switch may include a first PCIe port communicatively coupled to a first PCIe fabric, a second PCIe port communicatively coupled to a second, different PCIe fabric, and a third PCIe port communicatively coupled to the single PCIe port of the storage controller. The first PCIe port and the second PCIe port may be configured to be selectively communicatively coupled to a non-transparent bridge (NTB) of the PCIe switch.

9 Claims, 4 Drawing Sheets

(56) References Cited

U.S. PATENT DOCUMENTS

2015/0262633 A1 9/2015 Lee

OTHER PUBLICATIONS

Kwok Kong, Non-transparent Bridging with IDT 89HPES32NT24G2 PCI Express, NTB Switch. Application Note AN-724. Integrated Device Technology, Inc,2009. URL:https://www.idt.com/document/apn/724-non-transparent-bridging-idt-pes32nt24g2-pcie-switch, Feb. 27, 2018.

Office Action issued in corresponding German Patent Application No. 10 2017 113 576.6, dated Feb. 3, 2018 (12 pages).

Webster, OCZ Demos Z-Drive 6000 NVMe SSD Dual-Port Performance-Flash Memory Summit 2015 Update, Aug. 12, 2015, Retrieved from http://www.thessdreview.com/daily-news/latest-buzz/ocz-demos-z-drive-6000-nvme-ssd-dual-port-performance-flash-memory-summit-2015-update/, 3 pgs.

Mearian, TMS releases upgraded OS, flash array with 40Gpbs InfiniBand, ComputerWorld, Feb. 28, 2012, Retrieved from http://www.computerworld.com/article/2501760/data-center/tms-releases-upgraded-os--flash-array-with-40gbps-infiniband.html, 4 pgs.

* cited by examiner

DUAL-PORTED PCI EXPRESS-BASED STORAGE CARTRIDGE INCLUDING SINGLE-PORTED STORAGE CONTROLLERS

TECHNICAL FIELD

This disclosure generally relates to network attached storage systems.

BACKGROUND

Network attached storage (NAS) systems used in enterprise applications may be designed as highly available systems, which include redundancy to mitigate effects of failure of components in the system. For example, a highly available NAS may include two sets of network ports into the NAS, two control CPUs, and two switch networks for attaching to storage cartridges. Each storage cartridge may include two ports, each respective port being used to attach the storage cartridge to a respective one of the two switch networks.

SUMMARY

In some examples, the disclosure describes a storage cartridge including a storage controller comprising a single PCIe port and a PCIe switch. The PCIe switch may include a first PCIe port communicatively coupled to a first PCIe fabric, a second PCIe port communicatively coupled to a second, different PCIe fabric, and a third PCIe port communicatively coupled to the single PCIe port of the storage controller. The first PCIe port and the second PCIe port may be configured to be selectively communicatively coupled to a non-transparent bridge (NTB) of the PCIe switch.

In some examples, the disclosure describes a network attached storage system including a first control CPU, a second control CPU, a first PCIe switch communicatively coupled to the first control CPU, a second PCIe switch communicatively coupled to the second control CPU, and a storage cartridge. The storage cartridge may include a storage controller comprising a single PCIe port and a third PCIe switch. The third PCIe switch may include a first PCIe port communicatively coupled to the first PCIe switch, a second PCIe port communicatively coupled to the second PCIe switch, and a third PCIe port communicatively coupled to the single PCIe port of the storage controller. The first PCIe port and the second PCIe port may be configured to be selectively communicatively coupled to a non-transparent bridge (NTB) of the third PCIe switch.

In some examples, the disclosure describes a method including receiving, by a storage controller of a storage cartridge, a non-transparent bridge (NTB) assign command from a control CPU. The storage controller may include a single PCIe port. The storage cartridge may include the storage controller and a PCIe switch. The PCIe switch may include a first PCIe port communicatively coupled to a first PCIe fabric, a second PCIe port communicatively coupled to a second, different PCIe fabric, and a third PCIe port communicatively coupled to the single PCIe port of the storage controller. The method also may include communicating, by the storage controller, to the PCIe switch, based on the NTB assign command, a command to cause the NTB to communicatively couple to either the first PCIe port of the PCIe switch or the second PCIe port of the PCIe switch.

The details of one or more examples are set forth in the accompanying drawings and the description below. Other features, objects, and advantages will be apparent from the description and accompanying drawings, and from the claims.

DETAILED DESCRIPTION

This disclosure describes a storage cartridge that includes at least one storage controller that includes a single peripheral component interconnect express (PCIe) port and a PCIe switch that includes two PCIe ports configured to connect the storage cartridge to external devices, such as respective PCIe fabrics. The PCIe switch allows the single-ported storage controller to be used in a dual ported system, allowing single-ported storage controllers to be used in highly available network attached storage (NAS) systems. This may allow commercially available PCIe-based storage controllers to be used in highly available NAS systems, rather than requiring new dual port PCIe-based storage controllers to be developed for use in highly available NAS systems.

To allow the single-ported storage controller to be used in a dual-ported system, the PCIe switch includes a non-transparent bridge (NTB). A NTB allows two PCIe fabrics to be connected to a single switch and may prevent devices on the first PCIe fabric from seeing fully into the second PCIe fabric, and vice-versa. Rather, the NTB may provide a window for devices connected to the first PCIe fabric to see into the second PCIe fabric and vice-versa. Further, as each PCIe fabric uses a respective address scheme, the NTB may provide address translation between the addresses used by the respective PCIe fabrics, allowing devices from the second PCIe fabric to access devices from the first PCIe fabric, and vice versa. In this way, including a PCIe switch that includes an NTB on one of the PCIe ports of the PCIe switch allows a single-ported storage controller to be used in a dual-ported NAS system.

Figure 1:
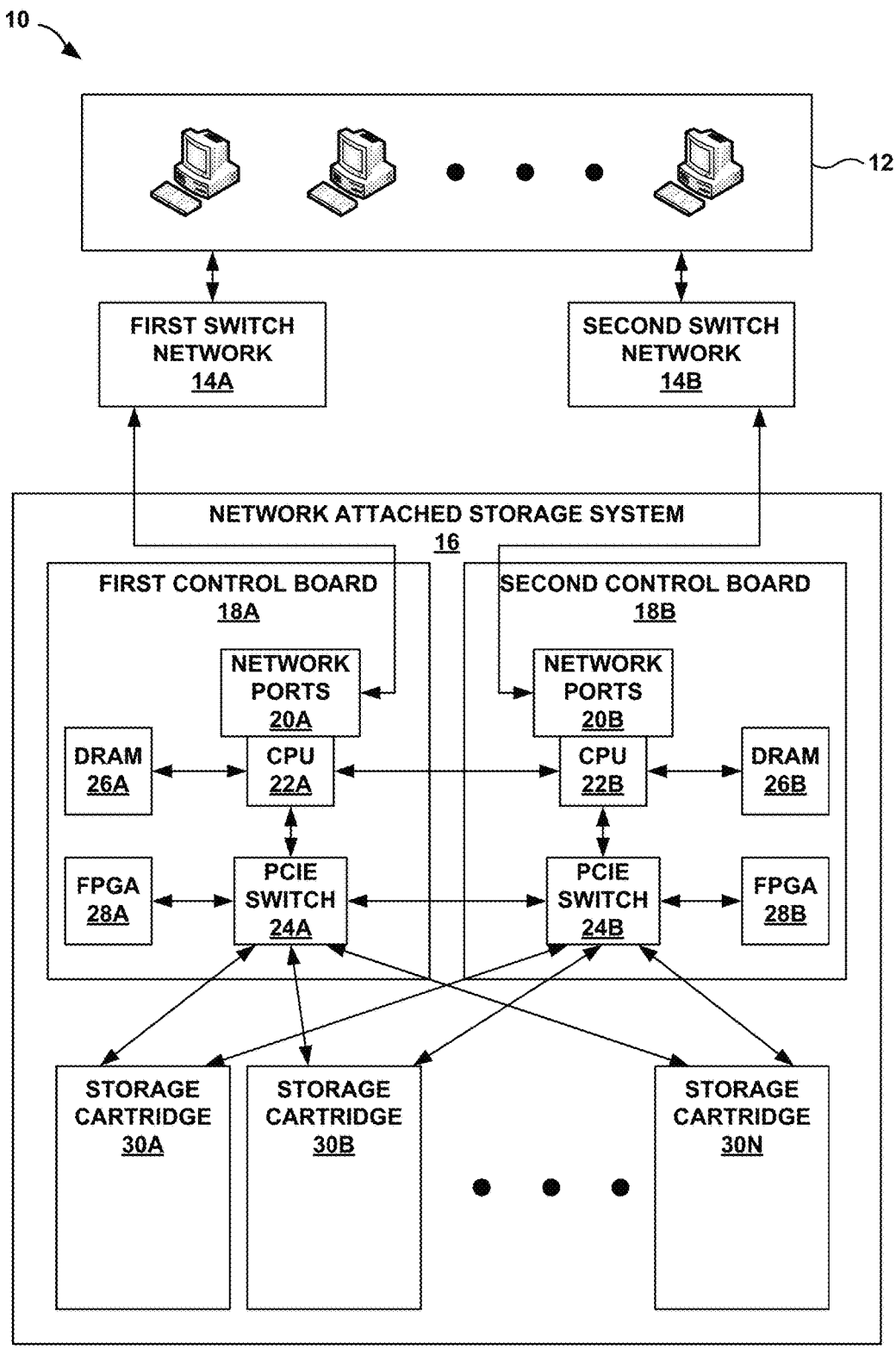
FIG. 1 is a conceptual and schematic block diagram illustrating an example storage environment in which a network attached storage (NAS) system may function as a storage device for a plurality of host devices, in accordance with one or more aspects of this disclosure.

FIG. 1 is a conceptual and schematic block diagram illustrating an example storage environment 10 in which a NAS system 16 may function as a data storage device for host devices 12, in accordance with one or more techniques of this disclosure. For instance, host devices 12 may utilize non-volatile memory devices included in NAS system 16 to store and retrieve data.

Storage environment 10 may include a plurality of host devices 12 which may store and/or retrieve data to and/or from one or more storage devices, such as NAS system 16. As illustrated in FIG. 1, host devices 12 may communicate with NAS system 16 via first switch network 14A and second switch network 14B (collectively, "switch networks 14"). Host devices 12 may include any of a wide range of devices, including computer servers, cloud-based computing clusters, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, and the like.

Switch networks 14 may include one or both of a data bus for exchanging data with host devices 12 and a control bus for exchanging commands with host devices 12. In some examples, each of switch networks 14 may include a switched fabric, in which all of host devices 12 are connected to each of network ports 20A and 20B via switches. Switch networks 14 may utilize any suitable network transport technology. For example, switch networks 14 may utilize one or more of Ethernet, InfiniBand, Fibre Channel, or the like. By including two switch networks 14A and 14B, storage environment 10 is fully dual-ported from host devices 12 to storage cartridges 30A-30N (collectively, "storage cartridges 30"). In this way, if one of first switch network 14A or second switch network 14B fails, host devices 12 can still connect to NAS system 16 using the other of switch network 14A or second switch network 14B.

Each of switch networks 14 is communicatively coupled to NAS storage system 16. For example, in FIG. 1, first switch network 14A is communicatively coupled to first network ports 20A of first control board 18A of NAS system 16. Similarly, in FIG. 1, second switch network 14B is communicatively coupled to second network ports 20B of second control board 18B of NAS system 16.

NAS system 16 includes two control boards 18A and 18b (collectively, "control boards 18"), again providing redundancy for a highly available system. Control boards 18 contain components for controlling NAS system 16, including control CPUs 22A and 22B (collectively, "control CPUs 22"), DRAM 26A and 26B (collectively, "DRAM 26"), and PCIe switches 24A and 24B (collectively, "PCIe switches 24").

Control board 18A includes one or more first network ports 20A, which are communicatively coupled to first switch network 14A and allow communication between first control board 18A (e.g., first control CPU 22A) and host devices 12. First network ports 20A may implement any protocol, network transport technology, and connector form factor, and each of which may be based on the technology used by switch networks 14.

One or more first network ports 20A are communicatively coupled to first control CPU 22A. For example, one or more first network ports 20A and first control CPU 22A may be connected to common printed circuit board (PCB) and communicatively coupled using one or more electrical conductive traces on or in the PCB.

First control CPU 22A controls operation of NAS system 16, alone or in combination with second CPU 22B on second control board 18B. First control CPU 22A may also be referred to as a controller of NAS system 16. First control CPU 22A may be any type of processor, including, for example, a microprocessor, a digital signal processor (DSP), an application specific integrated circuit (ASIC), a field programmable gate array (FPGA), or any other equivalent integrated or discrete logic circuitry, as well as any combinations of such components. In some examples, first control CPU 22A may include an x86-based processor, such as an x86-based processor available from Intel® or AMD®.

First control CPU 22A receives commands from and exchanges data with host devices 12 via switch networks 14. First control CPU 22A causes NAS system 16 to execute the commands to store or retrieve data from storage cartridges 30. The commands received from host devices 12 may include read commands and write commands. First control CPU 22A also perform other functions, such as a flash translation layer (logical-to-physical mapping or indirection), command queuing, write aggregation, read caching, encryption and decryption of data, compression and decompression of data, error correction code to allow recovery of error-laden data, RAID commands, and background system tasks, such as wear leveling, garbage collection, system status tracking, or the like.

In some examples, first control board 18A may include an FPGA 28A, which functions as an offload processor. FPGA 28A may be configured to perform one or more operations instead of control CPU 22A to reduce a workload of CPU 22A. For example, FPGA 28A may offload one or more of write queue management, compression, encryption, RAID computation, decompression, deduplication, decryption, read caching, or the like from control CPU 22A. In some examples, first control board 18A may omit FPGA 28A, second control board 18B may omit FPGA 28B, or both.

First control board 18A also includes first DRAM 26A. First DRAM 26A is working memory for first control CPU 22A, and first FPGA 28A and storage controllers of storage cartridges 30A may access first DRAM 26A via first PCIe switch 24A. First DRAM 26A may store data related to operation of first control CPU 22A, FPGA 28A, and storage controllers of storage cartridges 30A, including, for example, task queues such as read queues, write queues, or the like; read buffers; logical-to-physical address translation tables, or the like.

First control board 18A also includes a first PCIe switch 24A. First PCIe switch 24A connects various devices or components to a PCIe fabric, including CPU 22A, FPGA 28A, and storage cartridges 30. In some examples, as shown in FIG. 1, first PCIe switch 24A also provides a communication link to second PCIe switch 24B of second control board 18B. In some examples, rather than including a single first PCIe switch 24A, first control board 18A may include multiple first PCIe switches 24A, such as a primary PCIe switch and an auxiliary PCIe switch. In some examples in which first control board 18A includes a primary PCIe switch and an auxiliary PCIe switch, the primary PCIe switch may provide access to storage cartridges 30 local to a layer of first control board 18A (e.g., a subset of storage cartridges 30) and the auxiliary PCIe switch may provide access to storage cartridges 30 local to a layer of second control board 18B (e.g., a second subset of storage cartridges 30). In this way, first PCIe switch 24A, whether a single switch or multiple switches, may provide first control CPU 22A and first FPGA 28A access to all of storage cartridges 30.

Similarly, second control board 18B includes second network ports 20B, second control CPU 22B, second DRAM 26B, second PCIe switch 24B, and second FPGA 28B. Each of second network ports 20B, second control CPU 22B, second DRAM 26B, second PCIe switch 24B, and second FPGA 28B may be similar to or substantially the same as first network ports 20A, first control CPU 22A, first DRAM 26A, first PCIe switch 24A, and first FPGA 28A.

In some examples, first control CPU 22A and second control CPU 22B may both be active simultaneously, referred to as an active-active configuration. In other examples, one of first control CPU 22A and second control CPU 22B may be active, and the other may be passive or idle, referred to as an active-passive configuration. The passive or idle control CPU is present in case of failure of the active control CPU.

In examples in which first control CPU 22A and second control CPU 22B are in an active-active configuration or an active-passive configuration, first control CPU 22A and second control CPU 22B may exchange data to maintain state information, such as coordinating write updates to storage cartridges 30. As shown in FIG. 1, in some examples, first control CPU 22A and second control CPU 22B may be communicatively coupled by a dedicated link.

In some examples, NAS system 16 may include additional components not shown in FIG. 1. For example, NAS system 16 may include one or more power supply, and may include a midplane that routes signals among storage cartridges 20 and control boards 18. Further, in some examples, first control board 18A may be separated into a control board that includes first network ports 20A, first control CPU 22A, and first DRAM 26A; and a router board that includes first PCIe switch 24A and first FPGA 28A. Likewise, second control board 18B may be separated into a control board that includes second network ports 20B, second control CPU 22B, and second DRAM 26B; and a router board that includes second PCIe switch 24B and second FPGA 28B.

Each of first control CPU 22A and second control CPU 22B is a root port of a PCIe fabric centered around first PCIe switch 24A and second PCIe switch 24B, respectively. Each PCIe fabric utilizes its own address scheme, assigned during enumeration performed by the PCIe driver executed by the respective control CPU. Devices from one PCIe fabric may be prevented from fully seeing into the other PCIe fabric to prevent contention between devices and address schemes. As such, PCIe switches 24A and 24B may be connected by a port with a non-transparent bridge (NTB). A NTB allows the two PCIe fabrics to be connected via PCIe switches 24 and prevents devices on the first PCIe fabric from seeing fully into the second PCIe fabric, and vice-versa. Rather, the NTB may provide a window for device connected to the first PCIe fabric to see into the second PCIe fabric and vice-versa. Further, the NTB may provide address translation between the addresses used by the respective PCIe fabrics, allowing devices from the second PCIe fabric to access devices from the first PCIe fabric, and vice versa. In some examples, one of first control CPU 22A and second control CPU 22B is designated as a master control CPU and the other as a slave control CPU.

As NAS system 16 is a highly available, dual ported system, each of storage cartridges 30 includes two ports-a connection to each of first PCIe switch 24A and second PCIe switch 24B. As such, each storage cartridge of storage cartridges 30 is connected to the first PCIe fabric and the second PCIe fabric.

In accordance with examples of this disclosure, at least one storage cartridge of storage cartridges 30 includes a single-ported storage controller. To enable use of a single-ported controller in a dual-ported storage cartridge, the storage cartridge also may include a PCIe switch that includes two external ports (connecting the storage cartridge to PCIe switches 24A and 24B). The external ports may be selectively communicatively coupled to a NTB. The NTB allows the two PCIe fabrics to be connected via the PCIe switch in the storage cartridge and prevents devices on the first PCIe fabric from seeing fully into the second PCIe fabric, and vice-versa. Rather, the NTB may provide a window for device connected to the first PCIe fabric to see into the second PCIe fabric and vice-versa. Further, the NTB may provide address translation between the addresses used by the respective PCIe fabrics, allowing devices from the second PCIe fabric to access devices from the first PCIe fabric, and vice versa. In some examples, the master control CPU enumerates the storage cartridges 30, and the NTB is communicatively coupled to the port coupled to the PCIe fabric of the slave control CPU. The NTB then performs address translation between the first PCIe fabric (of which the storage cartridges 30 are part) and the second PCIe fabric. In this way, both control CPUs 22 may access the storage cartridges that includes a single ported controller, even though the controller includes only a single ports.

Figure 2:
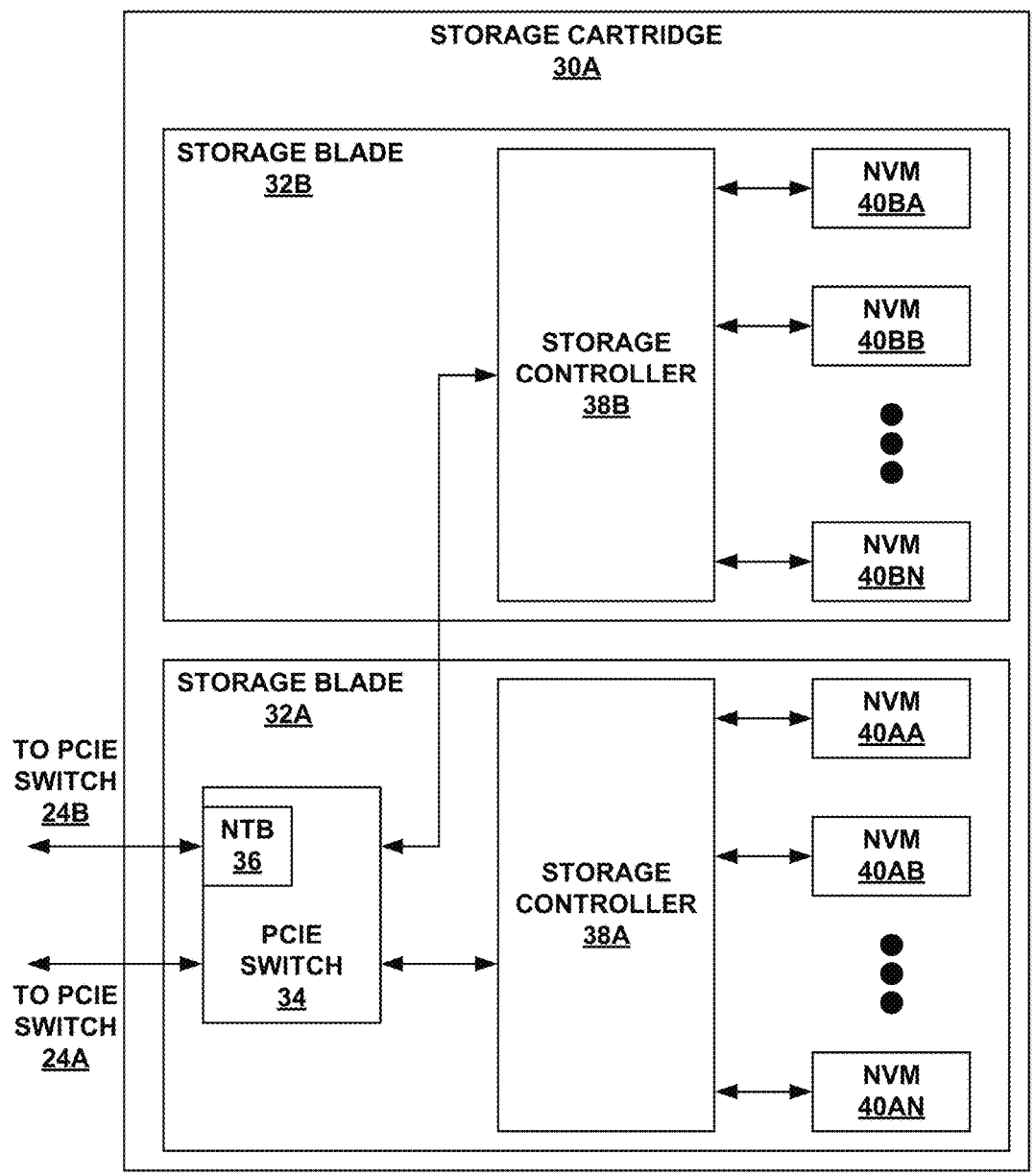
FIG. 2 is a conceptual and schematic block diagram illustrating an example storage cartridge, in accordance with one or more aspects of this disclosure.

FIG. 2 is a conceptual and schematic block diagram illustrating an example storage cartridge 30A, in accordance with one or more aspects of this disclosure. As shown in FIG. 2, storage cartridge 30A includes a first storage blade 32A and a second storage blade 32B. First storage blade 32A may be referred to as a mother blade and includes a PCIe switch 34. Second storage blade 32B may be referred to as a daughter blade, and is optional.

First storage blade 32A includes PCIe switch 34 that includes a NTB 36, a first single-ported storage controller 38A, and a first plurality of non-volatile memory devices 40AA-40AN (collectively, "NVM devices 40A"). NVM devices 40A may include any type of non-volatile memory devices. Some examples of NVM devices 40A include, but are not limited to, flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices. Each of NVM devices 40A are connected to first single-ported storage controller 38A by, e.g., by a dedicated channel.

First single-ported storage controller 38A controls operation of storage blade, e.g., based on commands received from control CPUs 22 or FPGAs 28 (FIG. 1). In some examples, first single-ported storage controller 38A may be a full-featured storage controller, and may provide or execute functionality for one or more of garbage collection, wear leveling, encryption, decryption, compression, decompression, error correcting code, command queues, read buffering, write aggregation, or the like. In other examples, first single-ported storage controller 38A may implement a reduced set of functionality, as control CPUs 22 and FPGAs 28 may implement some of the functionality of a more full-featured storage controller. For example, first single-ported storage controller 38A may perform program, erase, and read operations, and remaining functionality may be performed by control CPUs 22 and FPGAs 28. First single-ported storage controller 38A is communicatively coupled (e.g., electrically coupled) to PCIe switch 34 by a single PCIe port. In some examples in which plurality of NVM devices 40A are flash memory devices, first single-ported storage controller 38A may be referred to as a flash controller.

Second storage blade 32B is similar to first storage blade 32A, but does not include PCIe switch 34. Rather, second storage blade 32B includes second single-ported storage controller 38B and second plurality of NVM devices 40BA-40BN (collectively, "second plurality of NVM devices 40B"). Second single-ported storage controller 38B and second plurality of NVM devices 40B-40B may be similar to or substantially the same as first single-ported storage controller 38A and first plurality of NVM devices 40A-40A, respectively.

In the example of FIG. 2, PCIe switch 34 is a 2-to-2 switch. In some examples, such as when storage cartridge 30A omits second storage blade 32B, PCIe switch 34 may be a 2-to-1 switch. As shown in FIG. 2, PCIe switch 34 includes a first PCIe port communicatively coupled (e.g., electrically coupled) to first PCIe switch 24A, a second PCIe port communicatively coupled (e.g., electrically coupled) to second PCIe switch 24B, a third PCIe port communicatively coupled (e.g., electrically coupled) to first single-ported storage controller 38A, and a fourth PCIe port communicatively coupled (e.g., electrically coupled) to second single-ported storage controller 38B. In this way, PCIe switch 34 communicatively couples each of storage controllers 38 to each of PCIe switches 24.

PCIe switch 34 also includes NTB 36. In the example of FIG. 2, NTB 36 is coupled to the second PCIe port, which is communicatively coupled to second PCIe switch 24B. This implies that second control CPU 22B is the slave control CPU, and that first control CPU 22A is the master control CPU. In some examples, PCIe switch 34 may include logic or switches that allow NTB to be selectively assigned to any port of PCIe switch 34. In some examples, PCIe switch 34 may be controlled (e.g., by first single-ported storage controller 38A or one of control CPUs 22) so that NTB 36 is assigned to the PCIe switch associated with the slave control CPU.

As described above, NTB 36 allows the two PCIe fabrics (one associated with first PCIe switch 24A and the other associated with second PCIe switch 24B) to be connected via PCIe switch 34 prevents devices on the first PCIe fabric from seeing fully into the second PCIe fabric, and vice-versa. Rather, NTB 36 may provide a window for devices connected to the first PCIe fabric to see into the second PCIe fabric and vice-versa. Hence, as storage cartridge 30A may be enumerated by first control CPU 22A and be part of the first PCIe fabric, NTB 36 may allow second control CPU 22B and second FPGA 28B to see storage cartridge 30A. Further, NTB 36 may provide address bi-directional translation between the addresses used by the first PCIe fabric (including first control CPU 22A, first FPGA 28A, and storage cartridge 30A) and addresses used by the second PCIe fabric (including second control CPU 22B and second FPGA 28B), allowing second control CPU 22B and second FPGA 28B from the second PCIe fabric to access storage cartridge 30A and first and second plurality of NVM devices 40A and 40B.

Figure 3:
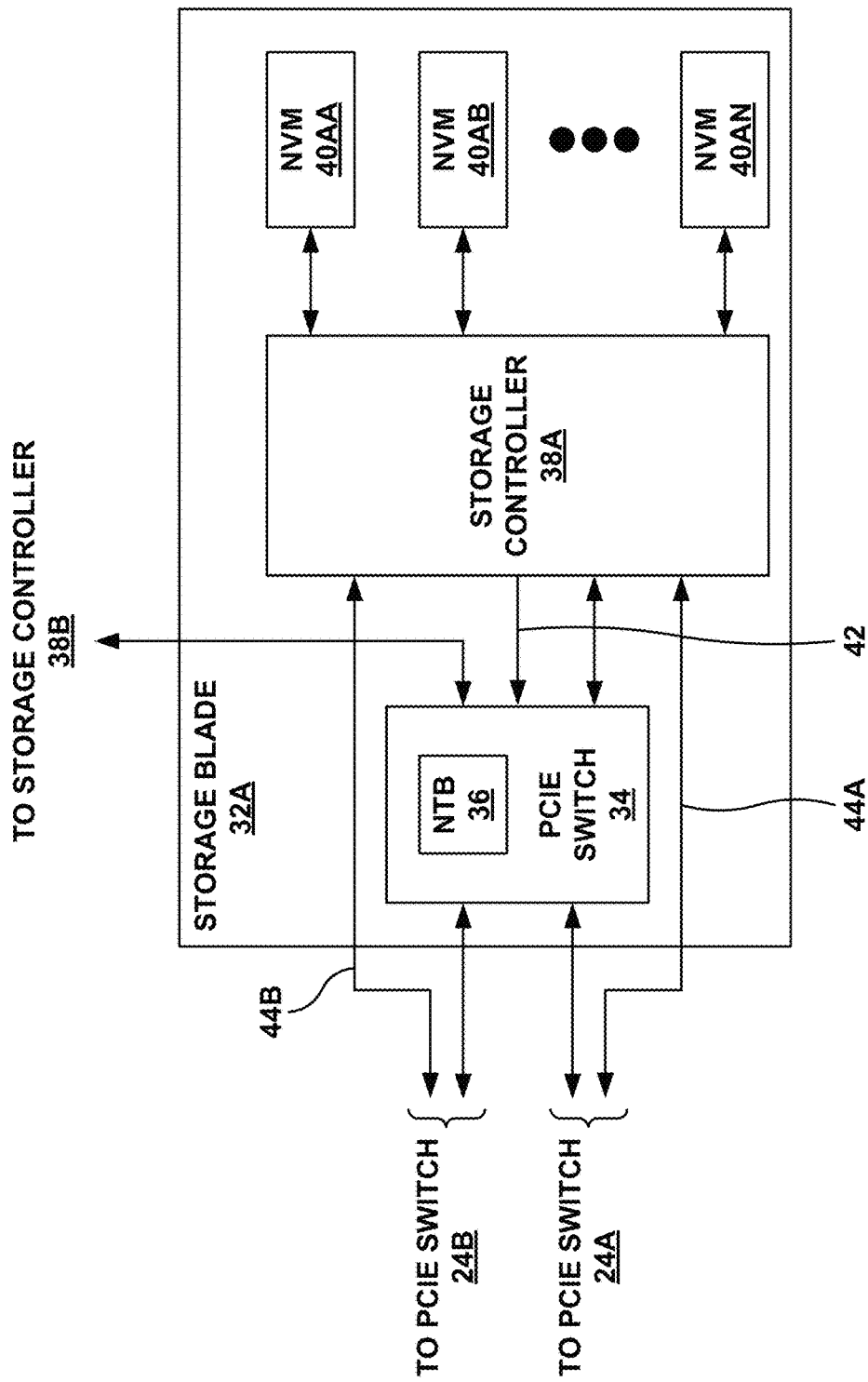
FIG. 3 is a conceptual and schematic block diagram illustrating an example storage blade, in accordance with one or more aspects of this disclosure.

FIG. 3 is a conceptual and schematic block diagram illustrating an example storage blade 32A, in accordance with one or more aspects of this disclosure. As shown in FIG. 3, and similar to storage blade 32A of FIG. 2, storage blade 32A include a PCIe switch 34, a first single-ported storage controller 38A, and a plurality of NVM devices 40A. In the example of FIG. 3, PCIe switch 34 includes four PCIe ports: a first PCIe port communicatively coupled (e.g., electrically coupled) to first PCIe switch 24A, a second PCIe port communicatively coupled (e.g., electrically coupled) to second PCIe switch 24B, a third PCIe port communicatively coupled (e.g., electrically coupled) to first single-ported storage controller 38A, and a fourth PCIe port communicatively coupled (e.g., electrically coupled) to second single-ported storage controller 38B. As described above, in other examples, PCIe switch 34 may include three ports, and may omit a connection to second single-ported storage controller 38B, e.g., in examples in which the storage container that includes storage blade 32A does not include a second storage blade.

Unlike the example shown in FIG. 2, in the example of FIG. 3, NTB 36 has not been assigned to a PCIe port. Further, in the example of FIG. 3, storage blade 32A includes additional features, including a switch control interface 42, a first sideband control interface 44A, and a second sideband control interface 44B.

Switch control interface 42 communicatively couples (e.g., electrically couples) first single-ported storage controller 38A and PCIe switch 34. For example, switch control interface 42 may include two or more electrical traces, one or more dedicated to receive and one or more dedicated to transmit. As another example, switch control interface 42 may enable only unidirectional communication from first single-ported storage controller 38A to PCIe switch 34 and thus may include one or more electrical traces dedicated to transmit from first single-ported storage controller 38A.

First single-ported storage controller 38A may be configured to communicate a command to PCIe switch 34 via switch control interface 42 to cause NTB 36 to be assigned to either the first PCIe port of PCIe switch 34 or the second PCIe port of PCIe switch 34. In other words, first single-ported storage controller 38A may be configured to communicate a command to PCIe switch 34 via switch control interface 42 to cause NTB 36 to be communicatively coupled to (e.g., electrically coupled to) either the first PCIe port of PCIe switch 34 or the second PCIe port of PCIe switch 34. In this way, first single-ported storage controller 38A may cause NTB 36 to be assigned to a port associated with a PCIe switch (e.g., first PCIe switch 24A or second PCIe switch 24B) associated with a slave control CPU (e.g., either first control CPU 22A or second control CPU 22B).

In some examples, first single-ported storage controller 38A may receive a NTB assign command from one of first control CPU 22A or second control CPU 22B during the PCIe enumeration process upon start-up of NAS system 16 (FIG. 1) or upon fail-over from first control CPU 22A being master to second control CPU 22B being master, or vice versa. First sideband control interface 44A communicatively couples (e.g., electrically couples) first single-ported storage controller 38A to first PCIe switch FPGA 28A or the CPU 22A (e.g., via a midplane, an I/O port, or a standard interface such as a universal asynchronous receiver/transmitter (UART), an inter-integrated circuit ($I^2C$) controller, or the like) and is configured to allow first single-ported storage controller 38A to communicate with first PCIe switch 24A (a first external device) while bypassing the PCIe switch 34. Similarly, second sideband control interface 44B communicatively couples (e.g., electrically couples) first single-ported storage controller 38A to second PCIe switch 24B and is configured to allow first single-ported storage controller 38A to communicate with second PCIe switch 24B (a second external device) while bypassing PCIe switch 34. In some examples, each of first sideband control interface 44A and second sideband control interface 44B (collectively, "sideband control interfaces 44") includes a first communication link (e.g., electrical trace) dedicated to transmit and a second communication link (e.g., electrical trace) dedicated to receive.

In this way, sideband control interfaces 44 allow first single-ported storage controller 38A to receive a NTB assign command from a master control CPU (e.g., either first control CPU 22A or second control CPU 22B), during the device enumeration process performed by the PCIe driver. In response to receiving the NTB assign command, first single-ported storage controller 38A may be configured to communicate a command based on the NTB assign command to PCIe switch 34 via switch control interface 42 to cause NTB 36 to be communicatively coupled to (e.g., electrically coupled to) either the first PCIe port of PCIe switch 34 or the second PCIe port of PCIe switch 34. In this way, without relying upon PCIe switch (which may not be correctly configured with respect to the NTB 36), the master control CPU may cause the NTB 36 to be assigned to the PCIe port of PCIe switch associated with the slave control CPU.

In some examples, single-ported storage controllers 38 utilize DRAM 26 (FIG. 1) for task queues, such as write queues, read queues, or the like. For example, control CPUs 22 may add tasks to respective queues associated with respective DRAM 26 (e.g., first control CPU 22A may add tasks to respective task queues stored in first DRAM 26A and second control CPU 22B may add tasks to respective task queues stored in second DRAM 26B), and single-ported storage controllers 38 may access the respective task queues to obtains tasks for executing. Some of the control logic for the task queues may be executed by control CPUs 22, and some of the control logic for the task queues may be executed by single-ported storage controllers 38. However, as single-ported storage controllers 38 are single-ported, single-ported storage controllers 38 may not be, without more, configured to access task queues from associated with both control CPUs 22.

In accordance with some examples of this disclosure, each of single-ported storage controllers 38 may support a defined number of task queues. For each of single-ported storage controllers 38, the total number of task queues may be divided by the number of control CPUs 22, and a respective number of task queues may be dedicated to each respective control CPU of control CPUs 22. In some examples, the task queues may be numbered or otherwise identified, thus, single-ported storage controllers 38 and control CPUs 22 may be aware of which storage queues are located in which DRAM 26.

For example, each of single-ported storage controllers 38 may support 1024 task queues. As NAS 16 includes two control CPUs 22A and 22B, the task queues may be divided in half, and for each of single-ported storage controllers 38, 512 task queues may be associated with or assigned to first control CPU 22A and 512 task queues may be associated with or assigned to second control CPU 22B. In some examples, single-ported storage controllers 38 may communicate an indication of the assigned ports to first control CPU 22A and second control CPU 22B, e.g., by a signal over the midplane connector.

Figure 4:
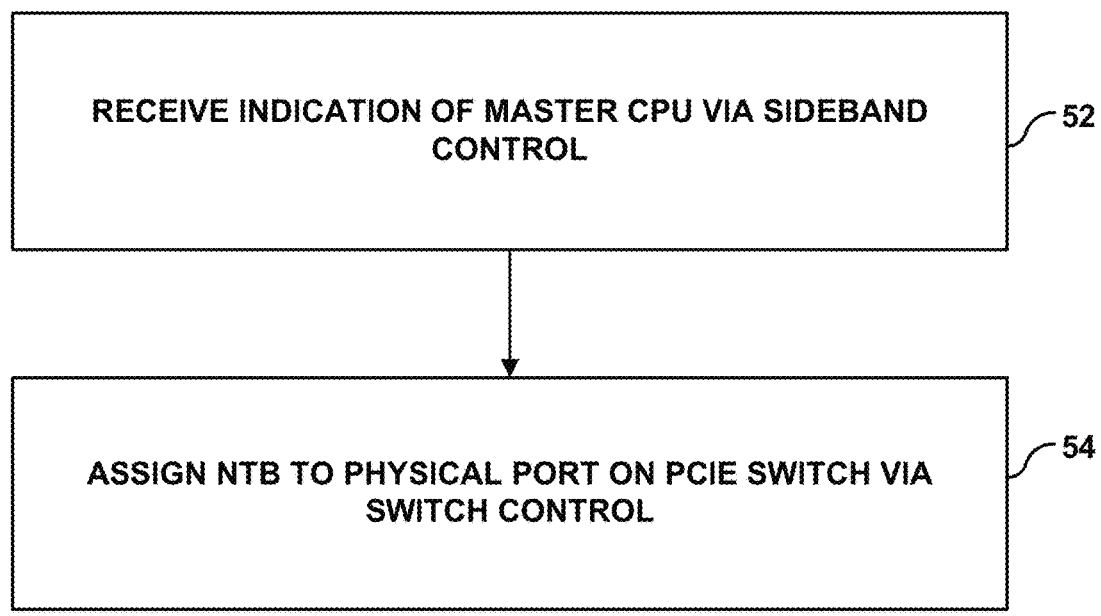
FIG. 4 is a flowchart illustrating an example technique for assigning a non-transparent bridge to a PCIe port, in accordance with one or more aspects of this disclosure.

FIG. 4 is a flowchart illustrating an example technique for assigning a non-transparent bridge to a PCIe port, in accordance with one or more aspects of this disclosure. The technique of FIG. 3 will be described with respect to storage environment 10 of FIG. 1, storage cartridge 30A of FIG. 2, and storage blade 32A of FIG. 3, although other devices and systems may implement the technique of FIG. 4, and storage environment 10 of FIG. 1, storage cartridge 30A of FIG. 2, and storage blade 32A of FIG. 3 may perform other techniques.

The technique of FIG. 4 includes receiving, by a storage controller (e.g., first single-ported storage controller 38A) of a storage cartridge 30A, a NTB assign command from a control CPU (e.g., first control CPU 22A or second control CPU 22B) (52). As described with reference to FIGS. 2 and 3, wherein the storage controller (e.g., first single-ported storage controller 38A) includes a single PCIe port. Storage cartridge 30A includes the storage controller (e.g., first single-ported storage controller 38A) and a PCIe switch 34. PCIe switch 34 includes a first PCIe port communicatively coupled to a first PCIe fabric, a second PCIe port communicatively coupled to a second, different PCIe fabric, and a third PCIe port communicatively coupled to the single PCIe port of the storage controller (e.g., first single-ported storage controller 38A). The NTB assign command may include an indication of a which control CPU is the master control CPU (e.g., first control CPU 22A or second control CPU 22B), which PCIe port of PCIe switch 34 the NTB 36 is to be assigned, which PCIe port of PCIe switch 34 is connected to a PCIe switch (24A or 24B) associated with the master control CPU (e.g., first control CPU 22A or second control CPU 22B), which PCIe port of PCIe switch 34 is connected to a PCIe switch (24A or 24B) associated with the slave control CPU (e.g., first control CPU 22A or second control CPU 22B), or the like.

The technique of FIG. 4 also includes communicating, by the storage controller (e.g., first single-ported storage controller 38A), to PCIe switch 34, based on the NTB assign command, a command to cause NTB 36 to communicatively couple (e.g., electrically couple or be assigned) to either the first PCIe port of PCIe switch 34 or the second PCIe port of the PCIe switch 34 (54). As described above, in some examples, NTB 36 may be communicatively coupled (e.g., electrically coupled or assigned) to the PCIe port of PCIe switch 34 that is connected to the slave control CPU (e.g., first control CPU 22A or second control CPU 22B) via the respective PCIe switch 24A or 24B. As a result, the other PCIe port (that is not assigned the NTB 36) is associated with the master control CPU (e.g., first control CPU 22A or second control CPU 22B) and provides a transparent connection to the PCIe fabric associated with the master control CPU (e.g., no address translation is required for devices associated with the PCIe fabric associated with the master control CPU to access storage cartridge 30A.

Although the foregoing examples have been described with respect to a controller of a storage device, in other scenarios, the examples described herein may be implemented by another processor, such as a general purpose processor, and the logical to physical data address translation table may be, for example, a translation lookaside buffer.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A storage cartridge comprising:
a storage controller comprising a single peripheral component interconnect express (PCIe) port;
a PCIe switch comprising:
a first PCIe port configured to be communicatively coupled to a first PCIe fabric;
a second PCIe port configured to be communicatively coupled to a second, different PCIe fabric; and
a third PCIe port communicatively coupled to the single PCIe port of the storage controller, wherein the first PCIe port and the second PCIe port are configured to be selectively communicatively coupled to a non-transparent bridge (NTB) of the PCIe switch;
a first sideband control interface communicatively coupled to the storage controller and configured to allow the storage controller to communicate with a first external device while bypassing the PCIe switch;
a second sideband control interface communicatively coupled to the storage controller and configured to allow the storage controller to communicate with a second external device while bypassing the PCIe switch; and
a switch control interface communicatively coupling the storage controller to the PCIe switch, wherein the storage controller is configured to:
receive a NTB assign command from the first external device or the second external device; and
communicate a command based on the NTB assign command to the PCIe switch via the switch control interface to cause the NTB to communicatively couple to either the first PCIe port of the PCIe switch or the second PCIe port of the PCIe switch.

2. The storage cartridge of claim 1, wherein:
the storage controller comprises a first storage controller;
the storage cartridge further comprises a second storage controller comprising a single PCIe port; and
the PCIe switch further comprises a fourth PCIe port communicatively coupled to the single PCIe port of the second storage controller.

3. The storage cartridge of claim 2, further comprising a first storage blade and a second storage blade, wherein the first storage blade comprises the PCIe switch, the first storage controller, and a first plurality of non-volatile memory devices, and wherein the second storage blade comprises the second storage controller and a second plurality of non-volatile memory devices.

4. A network attached storage (NAS) system comprising:
a first control CPU;
a second control CPU;
a first peripheral component interconnect express (PCIe) switch communicatively coupled to the first control CPU;
a second PCIe switch communicatively coupled to the second control CPU; and
a storage cartridge, wherein the storage cartridge comprises:
a storage controller comprising a single PCIe port; and
a third PCIe switch comprising:
a first PCIe port communicatively coupled to the first PCIe switch;
a second PCIe port communicatively coupled to the second PCIe switch;
a third PCIe port communicatively coupled to the single PCIe port of the storage controller, wherein the first PCIe port and the second PCIe port are configured to be selectively communicatively coupled to a non-transparent bridge (NTB) of the third PCIe switch;
a first sideband control interface communicatively coupled to the storage controller and configured to allow the storage controller to communicate with the first control CPU while bypassing the third PCIe switch; and
a second sideband control interface communicatively coupled to the storage controller and configured to allow the storage controller to communicate with the second control CPU while bypassing the third PCIe switch; and
a switch control interface communicatively coupling the storage controller to the third PCIe switch, wherein the storage controller is configured to:
receive a NTB assign command from the first external device or the second external device; and
communicate a command based on the NTB assign command to the third PCIe switch via the switch control interface to cause the NTB to communicatively couple to either the first PCIe port of the third PCIe switch or the second PCIe port of the third PCIe switch.

5. The NAS system of claim 4, wherein:
the storage controller comprises a first storage controller;
the storage cartridge further comprises a second storage controller comprising a single PCIe port; and
the PCIe switch further comprises a fourth PCIe port communicatively coupled to the single PCIe port of the second storage controller.

6. The NAS system of claim 5, wherein the storage cartridge further comprises a first storage blade and a second storage blade, wherein the first storage blade comprises the third PCIe switch, the first storage controller, and a first plurality of non-volatile memory devices, and wherein the second storage blade comprises the second storage controller and a second plurality of non-volatile memory devices.

7. The NAS system of claim 4, wherein the storage cartridge comprises a plurality of storage cartridges, wherein each respective storage cartridge of the plurality of storage cartridges comprises:
a respective storage controller comprising a single PCIe port; and a respective third PCIe switch comprising:
  a respective first PCIe port communicatively coupled to the first PCIe switch;
  a respective second PCIe port communicatively coupled to the second PCIe switch; and
  a respective third PCIe port communicatively coupled to the single PCIe port of the respective storage controller, wherein the respective first PCIe port and the respective second PCIe port are configured to be selectively communicatively coupled to a respective non-transparent bridge (NTB) of the respective third PCIe switch.

8. A method comprising:
receiving, by a storage controller of a storage cartridge, a non-transparent bridge (NTB) assign command from a control CPU, wherein the storage controller comprises a single peripheral component interconnect express (PCIe) port, wherein the storage cartridge comprises the storage controller and a PCIe switch, and wherein the PCIe switch comprises a first PCIe port communicatively coupled to a first PCIe fabric, a second PCIe port communicatively coupled to a second, different PCIe fabric, and a third PCIe port communicatively coupled to the single PCIe port of the storage controller;
communicating, by the storage controller, to the PCIe switch, based on the NTB assign command, a command to cause the NTB to communicatively couple to either the first PCIe port of the PCIe switch or the second PCIe port of the PCIe switch, wherein:
  the storage cartridge further comprises:
    a first sideband control interface communicatively coupled to the storage controller and configured to allow the storage controller to communicate with the control CPU while bypassing the PCIe switch;
    a second sideband control interface communicatively coupled to the storage controller and configured to allow the storage controller to communicate with a second external device while bypassing the PCIe switch; and
  the storage controller receives the NTB assign command from the control CPU via the first sideband control interface, wherein:
    the storage cartridge further comprises a switch control interface communicatively coupling the storage controller to the PCIe switch; and
    the storage controller communicates the command based on the NTB assign command to the PCIe switch via the switch control interface to cause the NTB to communicatively couple to either the first PCIe port of the PCIe switch or the second PCIe port of the PCIe switch.

9. The method of claim 8, wherein:
the storage controller comprises a first storage controller;
the storage cartridge further comprises a second storage controller comprising a single PCIe port; and
the PCIe switch further comprises a fourth PCIe port communicatively coupled to the single PCIe port of the second storage controller.

* * * * *